United States Patent Office 3,449,062
Patented June 10, 1969

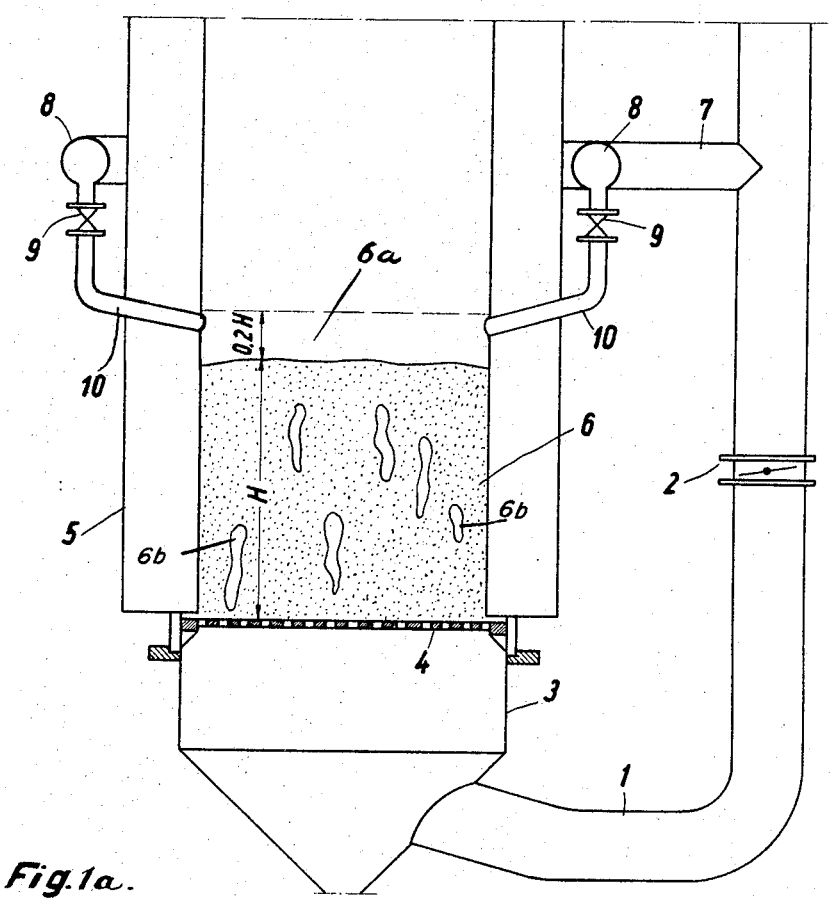
Fig. 1
Fig. 1a.
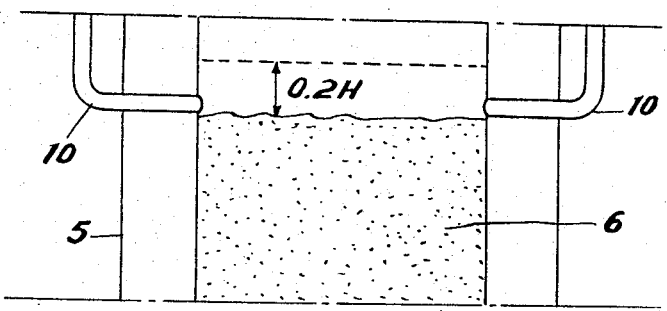
Inventors
LOTHAR REH
ROLAND MAURER
WALTER PIERSON
BODO PEINEMANN
BY Bailey, Stephens & Huettig
ATTORNEYS

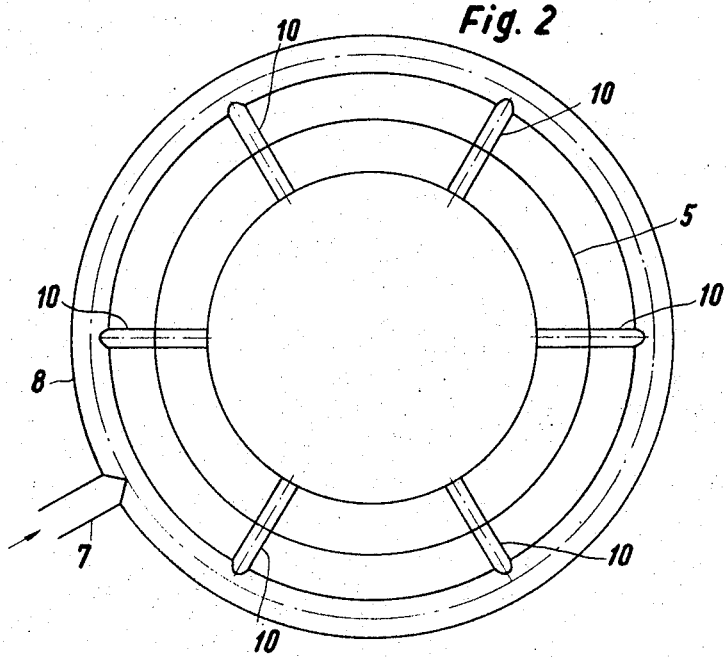
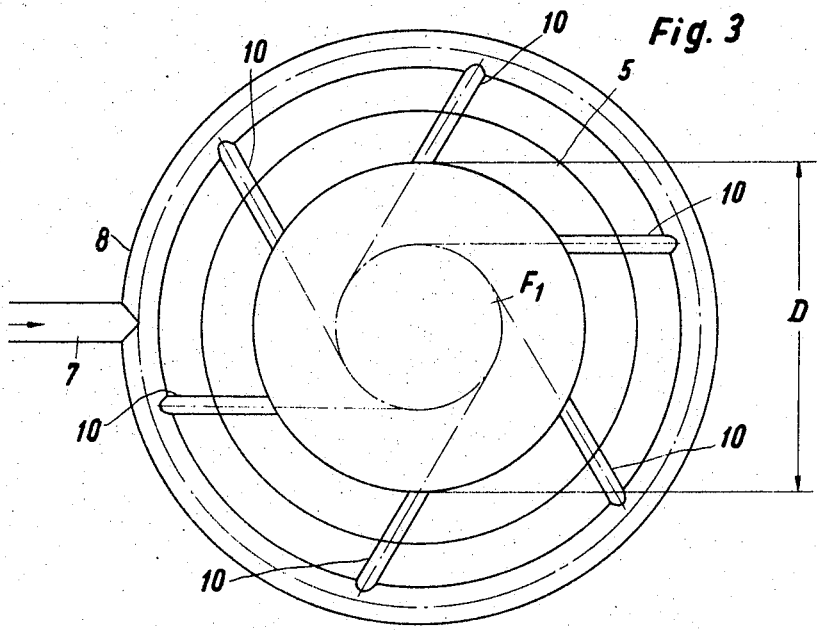

3,449,062
PROCESS OF CONTROLLING THE TEMPERATURE IN AND IMPROVING THE PERFORMANCE OF ENDOTHERMIC PROCESSES CARRIED OUT IN A FLUIDIZED BED
Lothar Reh, Frankfurt, Roland Maurer, Offenbach, and Walter Pierson and Bodo Peinemann, Frankfurt, Germany, assignors to Metallgesellschaft Aktiengesellschaft, Frankfurt am Main, Germany
Filed Sept. 27, 1966, Ser. No. 582,345
Claims priority, application Germany, Oct. 5, 1965, M 66,851
Int. Cl. C01b 17/58
U.S. Cl. 23—1                        7 Claims

ABSTRACT OF THE DISCLOSURE

The temperature of a fluid bed performing an endothermic reaction is controlled by introducing secondary oxidizing gas at certain rates and angles into a zone immediately above the bed.

---

This invention relates to an improved process for controlling the temperature in and improving the performance of endothermic processes, such as, combustion of clarifier sludge or for decomposing waste sulphuric acid into $SO_2$ and byproducts, wherein a primary oxidizing gas is supplied to the fluidized bed from the base of the bed and a secondary oxidizing gas is supplied to the bed at points closely above the bed at certain rates and angles.

The performance of endothermic processes, such as drying, calcining, reducing and annealing in fluidized beds at temperatures in the range of 600–1300° C. often requires a supply of substantial quantities of heat. In most cases, fluidized beds operating in this temperature range are heated by a direct injection of fuel into the fluidized bed where the fuel is burned. This combustion is supported by the fluidizing air which is fed through the grate of the reactor. The heat generated by the combustion is supplied to the fluidized bed. The fluidizing air is preheated in most cases by hot fuel gases directly admixed with it or by heat exchange with the hot exhaust gases from the reactor. In view of the design of the grate, it is not possible in most cases to preheat the fluidizing air to temperatures which are sufficiently high that the hot fluidizing gases can supply appreciable quantities of heat to the fluidized beds. For this reason, the throughput of an endothermic process carried out in a fluidized bed is primarily determined by the quantity of heat which is generated in the fluidized bed by the combustion of the fuel which has been injected into the bed.

To effect this heating, fuel in gaseous, liquid or dust form is laterally injected into the fluidized bed through a lance or injection nozzle which extends into the fluidized bed, together with an annular stream of compressed air surrounding the fuel stream. These lances are known in the art and generally consist of tube shaped feed devices. The stream of compressed air serves for distributing the fuel in the fluidized bed. Fuel in liquid or dust form can alternatively be injected into the fluidized bed from above in the form of a jet.

In fluidized beds which are heated in this way when the heat transfer is increased beyond a certain limit, which depends on the process conditions, the combustion zone will be shifted from the fluidized bed into the layer above this bed. This results in a temperature rise in the kiln shaft above the bed and in a temperature drop in the fluidized bed.

The temperature in the fluidized bed can drop to such an extent that combustion in the fluidized bed and consequently the desired reaction is discontinued. This is due to the fact that a higher heat transfer in the fluidized bed necessitates an increase of the rate of fluidizing gas because the amount of combustion air required increases and the formation of the gases evolved in most processes takes place at a higher rate. As a result, transverse mixing with the fluid bed of fuels injected laterally into the fluidized bed is reduced. Owing to the deficiency of oxygen, only an incomplete combustion of the fuel close to the point where it is injected takes place and fuel is carried by the fluidizing gas from the fluidized bed into the kiln shaft above the bed without contributing appreciably to heating of the fluidized bed. Thus, an increase in the load of the fluidized bed results in an increasing divergence of the bed and top temperatures of the reactor.

This phenomenon has previously been restricted by reducing the rate of air or fluidizing gas and inpecting secondary air into the kiln shaft above the fluid bed to make up for the reduction of the rate at which air is supplied from below. While this measure eliminates the undesired influence of the increased rate of the fluidizing gas on the divergence of temperatures, the load and consequently the throughput of the fluidized bed is reduced or limited.

It is also known to recycle the solids which fall through the grate back into the reactor by pneumatic conveyance through a duct, which discharges into the reactor above the fluidized bed. This measure is not adopted to control the divergence of temperatures because such recycling can be carried out in a discontinuous or in a continuous process.

It is further known in exothermic processes to effect the so-called afteroxidation of the fine-grained particles which leave the fluidized bed and which have not been reacted or have not been completely reacted. This may be effected by directing oxygen-containing gases onto the top of the fluidized bed. Baffles installed in the reactor above the fluidized bed dissipate the kinetic energy of the particles and define a chamber for the afteroxidation.

In the production of fuel gases by so-called gasification of finely divided, solid or liquid fuels in the fluidized bed, it is known to provide for a so-called aftergasifying zone above the fluidized bed. So-called aftergasifying agents which react exothermally are injected into the boundary zone between the fluidized bed and the aftergasifying zone and endothermally reacting aftergasifying agents are injected on a higher level.

These so-called afteroxidizing or aftergasifying steps in exothermic processes do not control the divergence of the bed and top temperatures because in exothermic processes the fuel is uniformly distributed in the fluidized bed so that this divergence is not so pronounced as in endothermic processes.

The invention is based on the surprising discovery that in endothermic processes carried out in a fluidized bed the divergence of the bed and top temperatures in the reactor can be substantially avoided and the performance of the bed can be considerably increased if a primary oxidizing fluid is supplied through the grate of the fluidized bed reactor and a secondary oxidizing fluid in an amount of 20–70% by volume of the total amount of gas discharged from the fluidized bed reactor is injected into a zone closely above the fluidized bed, which zone has a height up to 0.2 times that of the expanded fluidized bed, the secondary oxidizing fluid being injected either parallel to the top surface of the fluidized bed or with a downward inclination of less than 20° from the horizontal, i.e., at an angle of 0 to 20° from horizontal.

As the height of the fluidized bed varies to a slight extent during operation, e.g., as a result of an intermittent supply of material, the discharge openings for the secondary oxidizing fluid may become immersed in the fluidized bed if said openings are arranged for a horizontal discharge closely above the fluidized bed. This would adversely affect the purpose of the invention. For this reason, the discharge openings are preferably spaced above the top surface of the fluidized bed and have a slight downward inclination, which is less than 20°.

In further preferred embodiments of the invention, the secondary oxidizing fluid is either radially injected at a velocity of 10–30 cubic meters per second, preferably 15–20 cubic meters per second, through a plurality of injecting nozzles spaced around the periphery of the reactor, or is injected at a velocity of 5–25 cubic meters per second through a plurality of injection nozzles which are spaced around the periphery and define injection paths, which are tangential to a circle which is centered on the vertical axis of the fluidized bed and has an area which is 0.20–0.40 times the top surface area of the fluidized bed. These measures insure uniform distribution of the secondary oxidizing fluid throughout the top surface of the fluidized bed and consequently a good heating effect.

In a further preferred embodiment of the process according to the invention, the motion in the fluidized bed is controlled so that its fractional voidage is within the limits of $0.45 \leq \epsilon \leq 0.75$ and its Archimedes' number is between $10^2$ and $5 \times 10^6$.

The fractional voidage as employed herein is defined by the relation $$\epsilon = \frac{\text{Gas-filled volume in the fluidized bed}}{\text{Total volume of fluidized bed}}$$

The Archimedes' number is defined by the relation $$A_r = \frac{d_K^3 \times g(\gamma_K - \gamma_G)}{\nu^2 \times \gamma_G}$$

wherein $d_K$ = particle size in meters of particles within the fluidized bed,
$\nu$ = kinematic viscosity of the fluidizing fluid in m.$^2$/sec.,
$\gamma_K$ = specific gravity of particles within the bed in kg./m.$^3$,
$\gamma_G$ = specific gravity of fluidizing fluid in kg./m.$^3$, and
$g$ = gravitational acceleration in meter/sec.$^2$.

Optimum heating effects and optimum performance are obtained if the process is controlled within these limits.

The invention is further described with reference to the accompanying drawings wherein:

FIGURE 1 is a vertical sectional view showing a fluidized bed reactor of the invention;

FIGURE 1a is a partial vertical sectional view similar to that of FIGURE 1;

FIGURE 2 is a cross-sectional view showing a fluidized bed reactor with secondary air nozzles extending radially into the reactor; and FIGURE 3 is a cross-sectional view showing the fluidized bed reactor of the invention in which the secondary air nozzles extend tangentially into the reactor.

In the process of the invention primary air is supplied through duct 1, valve or damper 2, blast box 3 and grate 4 into the fluidized bed 6, which is maintained in the reactor shaft 5. Secondary air is injected into the shaft 5 above the fluidized bed 6 through duct 7, annular manifold 8, control dampers 9 and secondary air nozzles 10. In the drawings similar reference numerals refer to similar parts.

As shown in FIGURE 1 the secondary air or oxidizing gas is injected within a zone 6a which has a height up to 0.2H wherein H is the height of the fluidized bed. The fuel gas and material to be treated are injected into the fluidized bed through lances not shown. Bed 6 contains the usual air bubbles 6b.

FIGURE 1 shows the nozzles 10 downwardly inclined at an angle of approximately 15°.

The process according to the invention is further illustrated in the following examples.

EXAMPLE 1

In a kiln, similar to that shown in FIGURE 1, for burning clarifier sludge having a typical analysis of

| | Percent |
|---|---|
| Solid material (mostly organic) | 4.0 |
| Water | 96 | in a fluidized bed containing sand as auxiliary solids and heated with fuel gas (lower caloric value $H_u$=12,000 kcal./kg.), the total rate of oxidizing air was 2100 standard cubic meters per hour. The air had a temperature of 470° C. According to the invention, 1350 standard cubic meters per hour of this oxidizing air were blown into the fluidized bed through the grate as primary oxidizing fluid and 750 standard cubic meters per hour were injected onto the top surface of the fluidized bed as secondary oxidizing fluid in a radial direction with a downward inclination of 15° and at a velocity of 12 standard cubic meters per second through three secondary air nozzles evenly spaced around the periphery of the kiln. Fuel gas and the sludge were laterally injected into the bed through lances not shown in the drawings. At a combustion rate of 625 kg. of sludge per hour, the total gas rate at the outlet of the kiln, including the water vapor from the sludge, was 2850 standard cubic meters per hour so that the secondary air rate was 26.5% of the total gas throughput. The pressure drop in the fluidized bed was 1050 millimeters water gauge pressure. The height of the fluidized bed above the perforated grate was $H_w$=0.96 meter. Secondary air was injected on a level which was 1100 millimeters above the grate. Thus, the injecting openings were spaced above the fluidized bed by a distance which was 0.15 times the height of the fluidized bed. The temperature in the fluidized bed was 820° C. and the temperature in the head of the kiln was 860° C. The fluidized bed contained sand having an average particle size diameter of $d_K$=1.5 millimeters and a specific gravity of a grain of sand of $\gamma_K$=2300 kg./m.$^3$. The average specific gravity of the fluidizing gas in the fluidized bed was $\gamma_G$=0.27 kg./m.$^3$. The kinematic viscosity was $\nu$=168×10$^{-6}$ m.$^2$/sec. Archimedes' number was $A_r$=1×10$^4$ and the fractional voidage of the fluidized bed was $\epsilon$=0.5.

When the entire combustion air was supplied into the fluidized bed through the grate the conditions remaining the same in other respects, the combustion rate of the kiln was reduced to 300–400 kg. sludge per hour and a pronounced divergence became apparent between the bed temperature of 650° C. and a kiln head temperature of 860° C. The same result was obtained when the secondary air was injected at the same rate as stated above but at a higher level, i.e., 1500 millimeters above the hearth. Thus, the process according to the invention resulted in an increase in the kiln throughput of about 100%.

EXAMPLE 2

In a fluidized bed kiln for decomposing 40% waste sulphuric acid, the fluidized bed contained sand and was heated with so-called bunker C oil (fuel oil No. 6), which was injected through a plurality of lances, not shown in the drawings, extending laterally into the fluidized bed. 6000 standard cubic meters of fluidizing and oxidizing air per hour were charged through the grate and 6000 standard cubic meters of secondary oxidizing air per hour were charged through six inlet pipes evenly spaced aound the periphery of the kiln. The primary and secondary air was at a temperature of 450° C. The product gas left the kiln at a rate of 18400 standard cubic meters per hour and had the following composition by volume:

| | Percent |
|---|---|
| $SO_2$ | 6.5 |
| $O_2$ | 4.2 |
| $CO_2$ | 8.9 |
| $N_2$ | 50.9 |
| $N_2O$ | 29.4 |

The temperature was 950° C. at the kiln outlet and 900° C. in the fluidized bed. The fluidized bed contained sand having an average particle size $d_K \approx 1.5$ millimeters and a true specific gravity of $\gamma_K = 2300$ kg./m.$^3$. The fluidizing gas had a specific gravity $\gamma_G = 1.3$ kg. per standard cubic meter and kinematic viscosity $\nu = 140 \times 10^{-6}$ m.$^2$/sec. The Archimedes' number accordingly was $3.1 \cdot 10^3$. The fluidized bed had a surface area of 8 square meters and a pressure drop of 1050 millimeters water gauge pressure. The bed expanded to a fractional voidage $\epsilon = 0.65$ so that the bed had a height of 1.3 meters over the grate. The secondary air was injected at a rate of 6000 standard cubic meters per hour with a downward inclination of 10° to the horizontal on a level of 1.5 meters over the grate in paths which were tangential to a circle which was 1.4 meters in diameter and had an area, designated $F_1$ in FIGURE 3 equal to 0.2 times the area of the top surface of the fluidized bed. The secondary air was injected at a velocity of $v = 20$ standard cubic meters per second at the outlet of each of the six nozzles. The rate of secondary air was 32.5% by volume of the total gas stream at the outlet of the kiln.

Up to 750 kg. of waste acid were decomposed per cubic meter of the volume of the fluidized bed per hour. In the absence of the features of the invention under otherwise identical conditions with oil being consumed at the same rate, the afteroxidation in the head of the kiln reduced the decomposition to 300–400 kg. waste acid per hour per cubic meter of the fluidized bed.

We claim:
1. In a process of controlling the temperature in and improving the performance of endothermic processes carried out in a fluidized bed and in a fluidized bed reactor having a grate including the steps comprising injecting fuel and decomposable feed material into the fluidized bed, supplying a primary oxidizing fluid through the said grate, supplying a secondary oxidizing fluid into the said reactor above the fluidized bed, the improvements comprising injecting the secondary oxidizing fluid through injecting nozzles into a zone which is closely above the expanded fluidized bed at a rate of 20 to 70% by volume of gases discharged from the fluidized bed reactor, said zone being not greater than 0.2 times the height of the expanded fluidized bed and the secondary oxiding fluid being injected at an angle less than 20° downwardly inclined from the horizontal.

2. A process as in claim 1 wherein the secondary oxidizing fluid is radially injected at a velocity of 10–30 cubic meters per second through a plurality of injecting nozzles spaced around the periphery of said reactor.

3. A process as in claim 1 wherein the secondary oxidizing fluid is radially injected at a velocity of 15–20 cubic meters per second through a plurality of injecting nozzles spaced around the periphery of said reactor.

4. A process as in claim 1 wherein the secondary oxidizing fluid is injected at a velocity of 5–25 cubic meters per second through a plurality of injection nozzles which are spaced around the periphery of the reactor forming injection paths which are tangential to a circle having its center on the vertical axis of the fluidized bed and having an area which is 0.20–0.40 times the top surface area of the fluidized bed.

5. A process as in claim 1 wherein the fluidized bed has a fractional voidage of 0.45 to 0.75, inclusive, and an Archimedes' number of $10^2$ to $5 \times 10^6$, inclusive.

6. A process as in claim 1 wherein the decomposable feed material comprises clarifier sludge at a feed rate of about 625 kilograms per hour the steps comprising fluidizing the clarifier sludge in combination with sand in said reactor with 1350 standard cubic meters of primary oxidizing air being passed into the reactor through said grate and 750 standard cubic meters of secondary oxidizing air being passed into a radial direction at an angle of 15° from horizontal at a rate of 12 standard cubic meters per second into a zone immediately above the fluidized bed having a height 0.2 times that of the fluidized bed whereby the said sludge is burned and the temperature within the fluidized bed is controlled.

7. A process as in claim 1 wherein the decomposable feed material comprises waste 40% sulphuric acid at a feed rate of 750 kilograms per hour the steps comprising fluidizing said sulphuric acid in combination with sand and fuel oil in said reactor with 6000 standard cubic meters of primary oxidizing air at 450° C. being passed into the reactor through said grate and 6000 standard cubic meters of secondary oxidizing air at 450° C. being passed at an angle of 10° from horizontal at a rate of 20 standard cubic meters per second into a zone immediately above the fluidized bed having a height 0.2 times that of the fluidized bed whereby said sulfuric acid is decomposed and the temperature within said fluidized bed is controlled.

References Cited

UNITED STATES PATENTS

| 2,364,145 | 12/1944 | Huppke et al. | 23—1 |
| 2,733,137 | 1/1956 | Swaine et al. | 23—177 XR |
| 2,866,696 | 12/1958 | Godel | 23—1 XR |
| 2,884,303 | 4/1959 | Metrailer | 23—1 |
| 3,066,017 | 11/1962 | Jahnig | 23—1 XR |
| 3,139,726 | 7/1964 | Wilson et al. | |
| 3,146,067 | 8/1964 | Litchfield | 23—177 |
| 3,306,760 | 2/1967 | Zirngibl et al. | 106—288 |
| 3,383,171 | 5/1968 | Haeseler et al. | 23—177 |

EDWARD STERN, Primary Examiner.

U.S. Cl. X.R.

23—150, 162, 177, 220